United States Patent
Slayne et al.

(10) Patent No.: US 12,181,010 B2
(45) Date of Patent: Dec. 31, 2024

(54) TOLERANCE RING WITH DESIRED SLIP PERFORMANCE, ASSEMBLY, AND METHOD OF MAKING AND USING THE SAME

(71) Applicant: SAINT-GOBAIN PERFORMANCE PLASTICS RENCOL LIMITED, Coventry (GB)

(72) Inventors: Andrew R. Slayne, Bristol (GB); Stephen Saunders, Bristol (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 655 days.

(21) Appl. No.: 17/118,692

(22) Filed: Dec. 11, 2020

(65) Prior Publication Data

US 2021/0180653 A1    Jun. 17, 2021

Related U.S. Application Data

(60) Provisional application No. 62/948,133, filed on Dec. 13, 2019.

(51) Int. Cl.
 *F16D 7/02* (2006.01)
(52) U.S. Cl.
 CPC ................................... *F16D 7/021* (2013.01)
(58) Field of Classification Search
 CPC . F16D 1/06; F16D 1/08; F16D 1/0829; F16D 1/0835; F16D 7/02; F16D 7/021; F16D 7/022; Y10T 403/7047; Y10T 403/7058; Y10T 403/7061
 See application file for complete search history.

(56) References Cited

U.S. PATENT DOCUMENTS

| | | | | |
|---|---|---|---|---|
| 4,286,894 A | * | 9/1981 | Rongley | ............... F16D 1/0835 403/372 |
| 6,288,878 B1 | | 9/2001 | Misso et al. | |

(Continued)

FOREIGN PATENT DOCUMENTS

| | | |
|---|---|---|
| DE | 102008000022 A1 | 7/2009 |
| DE | 102013204617 A1 | 9/2014 |

(Continued)

OTHER PUBLICATIONS

International Search Report and Written Opinion for PCT/EP2020/085807, mailed Apr. 13, 2021, 16 pages.

*Primary Examiner* — Josh Skroupa
(74) *Attorney, Agent, or Firm* — Abel Schillinger, LLP; Ann Palma

(57) ABSTRACT

A tolerance ring including a sidewall including a plurality of radially extending projections on a first radial surface and an unformed region on a second radial surface opposite the first radial surface, where the tolerance ring provides a first break-away torque, $\tau_1$, defined as the breakaway torque between the tolerance ring projections and an inner component or an outer component, where the tolerance ring provides a second break-away torque, $\tau_2$, defined as the breakaway torque between the unformed region and the other of the inner component or the outer component, and wherein $1.1\ \tau_2 \leq \tau_1$.

19 Claims, 9 Drawing Sheets

(56) References Cited

U.S. PATENT DOCUMENTS

| | | | |
|---|---|---|---|
| 7,014,009 B2 * | 3/2006 | Yamamoto | F16D 7/021 464/30 |
| 8,021,072 B2 * | 9/2011 | Court | F16D 1/0835 403/372 |
| 8,186,904 B2 | 5/2012 | Snadden et al. | |
| 8,233,242 B2 * | 7/2012 | Court | F16D 7/021 403/372 |
| 8,363,359 B2 | 1/2013 | Slayne et al. | |
| 8,385,024 B2 | 2/2013 | Schmidt et al. | |
| 8,746,981 B2 | 6/2014 | Hartmann | |
| 9,022,683 B2 | 5/2015 | Nias et al. | |
| 9,145,925 B2 | 9/2015 | Nakamura et al. | |
| 9,222,521 B2 * | 12/2015 | Nias | F16D 7/021 |
| 9,620,158 B2 | 4/2017 | Araki et al. | |
| 9,920,794 B2 | 3/2018 | Asakura et al. | |
| 10,125,854 B2 | 11/2018 | Lingren et al. | |
| 2006/0228174 A1 | 10/2006 | Woodhead et al. | |
| 2008/0043375 A1 | 2/2008 | Hanrahan et al. | |
| 2008/0266717 A1 | 10/2008 | Court et al. | |
| 2010/0073820 A1 | 3/2010 | Slayne et al. | |
| 2011/0076096 A1 | 3/2011 | Slayne et al. | |
| 2012/0087044 A1 | 4/2012 | Schmidt et al. | |
| 2015/0114549 A1 | 4/2015 | Slayne et al. | |
| 2017/0167591 A1 | 6/2017 | Fujii et al. | |
| 2017/0219018 A1 | 8/2017 | Kurachi | |
| 2018/0306248 A1 | 10/2018 | Itta et al. | |
| 2019/0190345 A1 | 6/2019 | Childs | |
| 2021/0285500 A1 * | 9/2021 | Murakami | F16D 1/0835 |

FOREIGN PATENT DOCUMENTS

| | | | |
|---|---|---|---|
| EP | 0741067 A1 | 11/1996 | |
| EP | 1898108 A2 | 3/2008 | |
| EP | 1961979 A2 * | 8/2008 | F16C 11/04 |
| JP | 10100912 A * | 4/1998 | F16C 11/04 |
| JP | 2015137732 A | 7/2015 | |
| WO | WO-2005106269 A1 * | 11/2005 | F16D 1/0835 |
| WO | 2009087020 A1 | 7/2009 | |
| WO | 2010029429 A1 | 3/2010 | |
| WO | WO-2015073118 A2 * | 5/2015 | F16D 1/0835 |
| WO | 2021116435 A1 | 6/2021 | |

* cited by examiner

TOLERANCE RING WITH DESIRED SLIP PERFORMANCE, ASSEMBLY, AND METHOD OF MAKING AND USING THE SAME

CROSS-REFERENCE TO RELATED APPLICATION(S)

This application claims priority under 35 U.S.C. § 119(e) to U.S. Provisional Application No. 62/948,133, entitled "TOLERANCE RING WITH DESIRED SLIP PERFORMANCE, ASSEMBLY, AND METHOD OF MAKING AND USING THE SAME," by Andrew R. SLAYNE et al., filed Dec. 13, 2019, which is assigned to the current assignee hereof and incorporated herein by reference in its entirety.

FIELD OF THE DISCLOSURE

This disclosure generally relates to tolerance rings and, in particular, to tolerance rings that modify torque assemblies.

BACKGROUND

Commonly, tolerance rings constrain movement between relatively moving parts, such as rotating inner components in bores within outer components. Further, tolerance rings have a number of other potential advantages, such as compensating tolerances for parts that are not machined to exact dimensions, compensating for different coefficients of expansion between the parts, allowing rapid assembly, and durability. One type tolerance ring may be located in a gap between the outer surface of an inner component and the inner surface of the bore of an outer component to transmit torque within an assembly. Exemplary assemblies may include door, hood, tailgate, and engine compartment hinges, seats, steering columns, flywheels, driveshaft assemblies, or may include other assemblies notably those used in automotive applications. Sometimes, there exists a need to have desired slip at desired surfaces of the inner component and the outer component in such an assembly. Therefore, there exists is an ongoing need for improved tolerance rings that provide improved slip performance while maintaining appropriate tolerance compensation and providing a longer lifetime of the assembly.

BRIEF DESCRIPTION OF THE DRAWINGS

The present disclosure may be better understood, and its numerous features and advantages made apparent to those skilled in the art by referencing the accompanying drawings.

Figure 1:
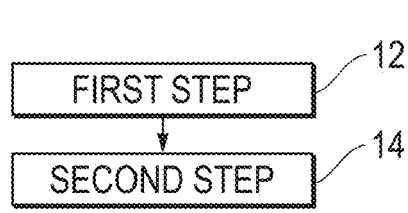
FIG. 1 includes a method of producing a tolerance ring in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DESCRIPTION OF THE DRAWING(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or assembly that comprises a list of features is not necessarily limited only to those features but may include other features not expressly listed or inherent to such method, article, or assembly. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the tolerance ring and tolerance ring assembly arts.

For purposes of illustration, FIG. 1 includes a diagram showing a forming process 10 for forming a tolerance ring. The forming process 10 may include a first step 12 of providing a material or composite material including a substrate. Optionally, the forming process 10 may further include a second step 14 of curling the ends of the material or composite material to form a tolerance ring.

Figure 2A:
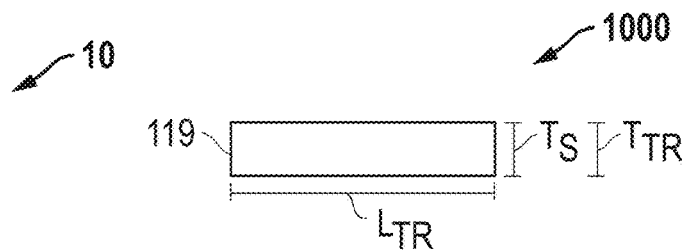
FIG. 2A includes a cross-sectional view of one embodiment of a tolerance ring in accordance with an embodiment.

FIG. 2A includes an illustration of a material 1000 that may be formed into the tolerance ring of the first step 12 of the forming process 10. The tolerance ring may include a substrate 119. In an embodiment, the substrate 119 can at least partially include a metal. According to certain embodiments, the metal may include iron, copper, titanium, tin, aluminum, alloys thereof, or may be another type of metal. More particularly, the substrate 119 can at least partially include a steel, such as, a stainless steel, carbon steel, or spring steel. For example, the substrate 119 can at least partially include a 301 stainless steel. The 301 stainless steel may be annealed, ¼ hard, ½ hard, ¾ hard, or full hard. Moreover, the steel can include stainless steel including chrome, nickel, or a combination thereof. In an embodiment, the substrate 119 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the substrate 119 may not include a mesh or grid. Further, the substrate 119 can include a Vickers pyramid number hardness, VPN, which can be ≥350, such as ≥375, ≥400, ≥425, or ≥450. VPN can also be ≤500, ≤475, or ≤450. VPN can also be within a range between, and including, any of the VPN values described herein. In another aspect, the substrate 119 can be treated to increase its corrosion resistance. In particular, the substrate 119 can be passivated. For example, the substrate 119 can be passivated according to the ASTM standard A967. The substrate 119 may be formed by at least one of chamfering, turning, reaming, forging, extruding, molding, sintering, rolling, or casting.

The substrate 119 can have a thickness Ts of between about 1 micron to about 1000 microns, such as between about 50 microns and about 500 microns, such as between about 100 microns and about 250 microns, such as between about 75 microns and about 150 microns. In a number of embodiments, the substrate 119 may have a thickness Ts of between about 50 and 1000 microns. It will be further appreciated that the thickness Ts of the substrate 119 may be any value between any of the minimum and maximum values noted above. The thickness of the substrate 119 may be uniform, i.e., a thickness at a first location of the substrate 119 can be equal to a thickness at a second location therealong. The thickness of the substrate 119 may be non-uniform, i.e., a thickness at a first location of the substrate 119 can be different than a thickness at a second location therealong.

Figure 2B:
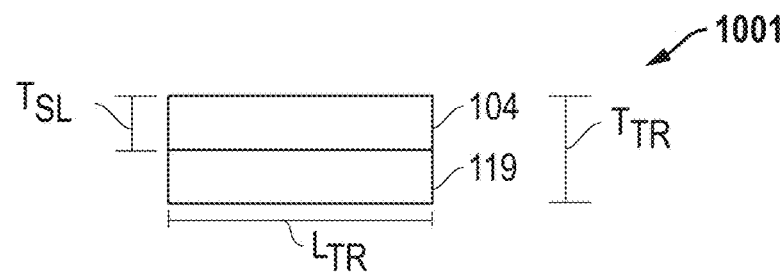
FIG. 2B includes a cross-sectional view of one embodiment of a tolerance ring in accordance with an embodiment.

FIG. 2B includes an illustration of a composite material 1001, alternative to the material 1000, that may be formed into the tolerance ring of the first step 12 of the forming process 10. For purposes of illustration, FIG. 2B shows the layer by layer configuration of a composite material 1001 of the tolerance ring. In a number of embodiments, the composite material 1001 may include substrate 119 (as mentioned above) and low friction layer 104 coupled to or overlying the substrate 119. In a more particular embodiment, the composite material 1001 may include a substrate 119 and a plurality of one low friction layers 104 overlying the substrate 119. As shown in FIG. 2B, the low friction layer 104 can be coupled to at least a portion of the substrate 119. In a particular embodiment, the low friction layer 104 can be coupled to a surface of the substrate 119 so as to form an interface with another surface of another component. The low friction layer 104 can be coupled to the radially inner surface of the substrate 119. Alternatively, the low friction layer 104 can be coupled to the radially outer surface of the substrate 119.

In a number of embodiments, the low friction layer 104 can include a low friction material. Low friction materials may include, for example, a polymer, such as a polyketone, a polyaramid, a polyphenylene sulfide, a polyethersulfone, a polyphenylene sulfone, a polyamideimide, ultra high molecular weight polyethylene, a fluoropolymer, a polybenzimidazole, a polyacetal, polybutylene terephthalate (PBT), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In an example, the low friction layer 104 includes polyketone, such as polyether ether ketone (PEEK), polyether ketone, polyether ketone ketone, polyether ketone ether ketone, a derivative thereof, or a combination thereof. In an additional example, the low friction layer 104 may include an ultra high molecular weight polyethylene. In another example, the low friction layer 104 may include a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The low friction layer 104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments. In an embodiment, the low friction layer 104 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the low friction layer 104 may not include a mesh or grid.

In a number of embodiments, the low friction layer 104 may further include fillers, including glass fibers, carbon fibers, silicon, PEEK, aromatic polyester, carbon particles, bronze, fluoropolymers, thermoplastic fillers, aluminum oxide, polyamideimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 10 wt % based on the total weight of the low friction layer, such as at least 15 wt %, 20 wt %, 25 wt % or even 30 wt %.

In an embodiment, the low friction layer 104 can have a thickness $T_{LFL}$ of between about 1 micron to about 500 microns, such as between about 10 microns and about 250 microns, such as between about 30 microns and about 150 microns, such as between about 40 microns and about 100 microns. In a number of embodiments, the low friction layer 104 may have a thickness $T_{LFL}$ of between about 50 and 250 microns. It will be further appreciated that the thickness $T_{LFL}$ of the low friction layer 104 may be any value between any of the minimum and maximum values noted above. The thickness of the low friction layer 104 may be uniform, i.e., a thickness at a first location of the low friction layer 104 can be equal to a thickness at a second location therealong. The thickness of the low friction layer 104 may be non-uniform, i.e., a thickness at a first location of the low friction layer 104 can be different than a thickness at a second location therealong. It can be appreciated that different low friction layers 104 may have different thicknesses. The low friction layer 104 may overlie one major surface of the substrate 119, shown, or overlie both major surfaces. The substrate 119 may be at least partially encapsulated by the low friction layer 104. That is, the low friction layer 104 may cover at least a portion of the substrate 119. Axial surfaces of the substrate 119 may be exposed from the low friction layer 104.

Figure 2C:
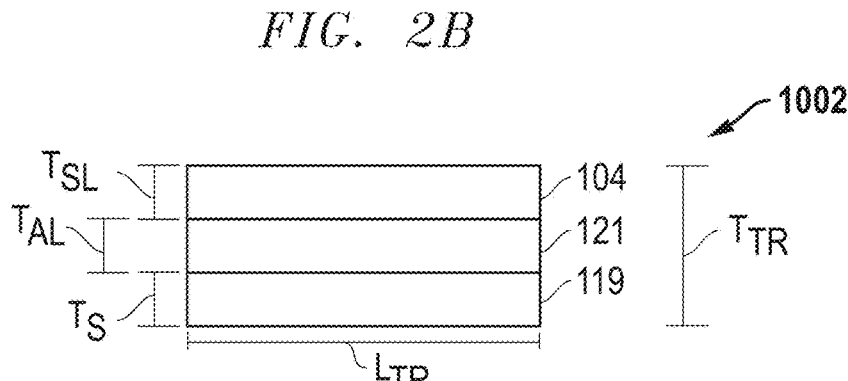
FIG. 2C includes a cross-sectional view of one embodiment of a tolerance ring in accordance with an embodiment.

FIG. 2C includes an illustration of an alternative embodiment of the composite material 1002, alternative to the materials 1000, 1001, that may be formed into the tolerance ring of the first step 12 of the forming process 10. For purposes of illustration, FIG. 2C shows the layer by layer configuration of a composite material 1002 of the tolerance ring. According to this particular embodiment, the composite material 1002 may be similar to the composite material 1001 of FIG. 2B, except this composite material 1002 may also include at least one adhesive layer 121 that may couple the low friction layer 104 to the substrate 119 and a low friction layer 104. In another alternate embodiment, the substrate 119, as a solid component, woven mesh or expanded metal grid, may be embedded between at least one adhesive layer 121 included between the low friction layer 104 and the substrate 119.

The adhesive layer 121 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof.

Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer.

Filler particles (functional and/or nonfunctional) may be added in to the adhesive layer 121 such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof.

In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 121 can have a thickness $T_{AL}$ of between about 1 micron to about 500 microns, such as between about 10 microns and about 250 microns, such as between about 30 microns and about 150 microns, such as between about 40 microns and about 100 microns. In a number of embodiments, the adhesive layer 121 may have a thickness $T_{AL}$ of between about 50 and 250 microns. In a number of embodiments, the adhesive layer 121 may have a thickness $T_{AL}$ of between about 80 and 120 microns. It will be further appreciated that the thickness $T_{AL}$ of the adhesive layer 121 may be any value between any of the minimum and maximum values noted above. The thickness of the adhesive layer 121 may be uniform, i.e., a thickness at a first location of the adhesive layer 121 can be equal to a thickness at a second location therealong. The thickness of the adhesive layer 121 may be non-uniform, i.e., a thickness at a first location of the adhesive layer 121 can be different than a thickness at a second location therealong.

Figure 2D:
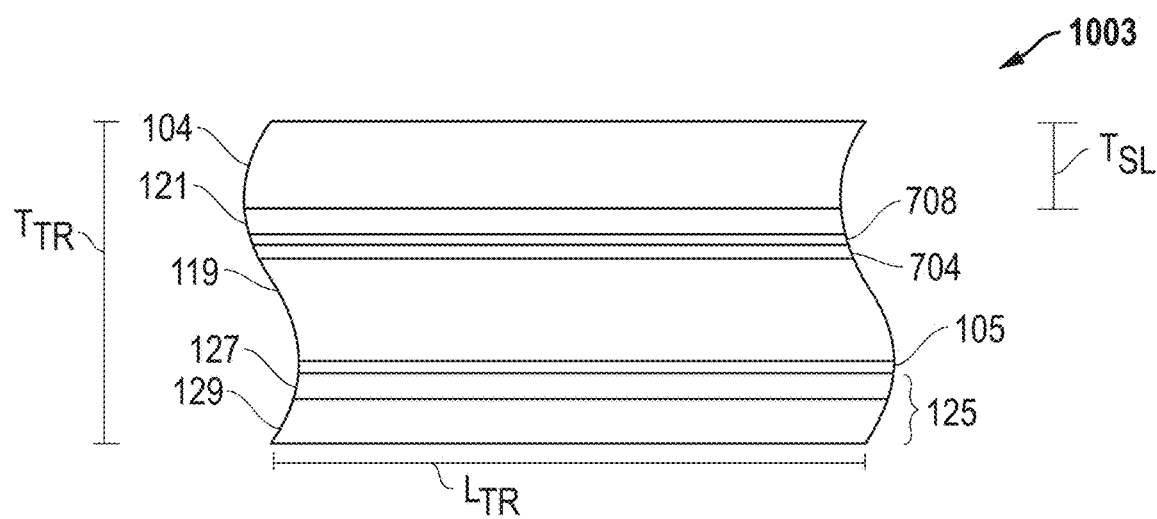
FIG. 2D includes a cross-sectional view of one embodiment of a tolerance ring in accordance with an embodiment.

FIG. 2D includes an illustration of an alternative embodiment of the composite material 1003, alternative to the materials 1000, 1001, 1002, that may be formed into the tolerance ring of the first step 12 of the forming process 10. For purposes of illustration, FIG. 2D shows the layer by layer configuration of a composite material 1003 of the tolerance ring. According to this particular embodiment, the composite material 1003 may be similar to the composite material 1002 of FIG. 2C, except this composite material 1003 may also include at least one corrosion protection layer 704, 705, and 708, and a corrosion resistant coating 1124 that can include an adhesion promoter layer 127 and an epoxy layer 129 that may couple to the substrate 119 and a low friction layer 104.

The substrate 119 may be coated with corrosion protection layers 704 and 705 including corrosion protection material to prevent corrosion of the composite material 1003 prior to processing. Additionally, a corrosion protection layer 708 can be applied over layer 704. Each of layers 704, 705, and 708 can have a thickness of about 1 to 50 microns, such as about 7 to 15 microns. Layers 704 and 705 can include corrosion protection materials including a phosphate of zinc, iron, manganese, or any combination thereof, or a nano-ceramic layer. Further, layers 704 and 705 can include corrosion protection materials including functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 708 can include functional silanes, nano-scaled silane based primers, hydrolyzed silanes, organosilane adhesion promoters, solvent/water based silane primers. Corrosion protection layers 704, 1706, and 708 can be removed or retained during processing.

As stated above, the composite material 1003 may further include a corrosion resistant coating 125. The corrosion resistant coating 125 can have a thickness of about 1 to 50 microns, such as about 5 to 20 microns, and such as about 7 to 15 microns. The corrosion resistant coating 125 can include an adhesion promoter layer 127 and an epoxy layer 129. The adhesion promoter layer 127 can include corrosion protection materials including phosphate of zinc, iron, manganese, tin, or any combination thereof, or a nano-ceramic layer. The adhesion promoter layer 127 can include corrosion protection materials including functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The adhesion promoter layer 127 can be applied by spray coating, e-coating, dip spin coating, electrostatic coating, flow coating, roll coating, knife coating, coil coating, or the like.

The epoxy layer 129 can be corrosion protection materials including a thermal cured epoxy, a UV cured epoxy, an IR cured epoxy, an electron beam cured epoxy, a radiation cured epoxy, or an air cured epoxy. Further, the epoxy layer 129 can include corrosion protection materials including polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners such as chromium, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_XH_YX_ZA_U$ as described above. In an embodiment, the epoxy layer 129 can include fillers to improve the conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the composite material as compared to a composite material without conductive fillers. In an embodiment, the epoxy layer 129 can be applied by spray coating, e-coating, dip spin coating, electrostatic coating, flow coating, roll coating, knife coating, coil coating, or the like. Additionally, the epoxy layer 129 can be cured, such as by thermal curing, UV curing, IR curing, electron beam curing, irradiation curing, or any combination thereof. Preferably, the curing can be accomplished without increasing the temperature of the component above the breakdown temperature of any of the low friction layer 104, the adhesive layer 121, the substrate 119, or the adhesion promoter layer 127. Accordingly, the epoxy may be cured below about 250° C., even below about 200° C.

In an embodiment, under step 12 of FIG. 1, any of the layers on the material or composite material 1000, 1001, 1002, 1003, as described above, can each be disposed in a roll and peeled therefrom to join together under pressure, at elevated temperatures (hot or cold pressed or rolled), by an adhesive, or by any combination thereof. Any of the layers of the material or composite material 1000, 1001, 1002, 1003, as described above, may be laminated together such that they at least partially overlap one another. Any of the layers on the material or composite material 1000, 1001, 1002, 1003, as described above, may be applied together using coating technique, such as, for example, physical or vapor deposition, spraying, plating, powder coating, or through other chemical or electrochemical techniques. In a particular embodiment, the low friction layer 104 may be applied by a roll-to-roll coating process, including for example, extrusion coating. The low friction layer 104 may be heated to a molten or semi-molten state and extruded through a slot die onto a major surface of the substrate 119. In an embodiment, the material or composite material 1000, 1001, 1002, 1003, may be a single unitary strip of material.

In other embodiments, under step 12 of FIG. 1, any of the layers on the material or composite material 1000, 1001, 1002, 1003, as described above, may be applied by a coating technique, such as, for example, physical or vapor deposition, spraying, plating, powder coating, or through other chemical or electrochemical techniques. In a particular embodiment, the low friction layer 104 may be applied by a roll-to-roll coating process, including for example, extrusion coating. The low friction layer 104 may be heated to a molten or semi-molten state and extruded through a slot die onto a major surface of the substrate 119. In another embodiment, the low friction layer 104 may be cast or molded.

In an embodiment, the low friction layer 104 or any layers can be glued to the substrate 119 using the melt adhesive layer 121 to form a laminate. In an embodiment, any of the intervening or outstanding layers on the material or composite material 1000, 1001, 1002, 1003, may form the laminate. The laminate can be cut into strips or blanks that can be formed into the tolerance ring. The cutting of the laminate may include use of a stamp, press, punch, saw, or may be machined in a different way. Cutting the laminate can create cut edges including an exposed portion of the substrate 119.

In an embodiment, under step 14 of FIG. 1, the blanks can be formed into the tolerance ring by curling the ends of the laminate strip or blank. The tolerance ring may be formed by stamp, press, punch, saw, rolling, flanging, deep-drawing, or may be machined in a different way.

After shaping the semi-finished tolerance ring, the semi-finished tolerance ring may be cleaned to remove any lubricants and oils used in the forming and shaping process. Additionally, cleaning can prepare the exposed surface of the load bearing substrate for the application of the coating. Cleaning may include chemical cleaning with solvents and/or mechanical cleaning, such as ultrasonic cleaning.

Figure 3A:
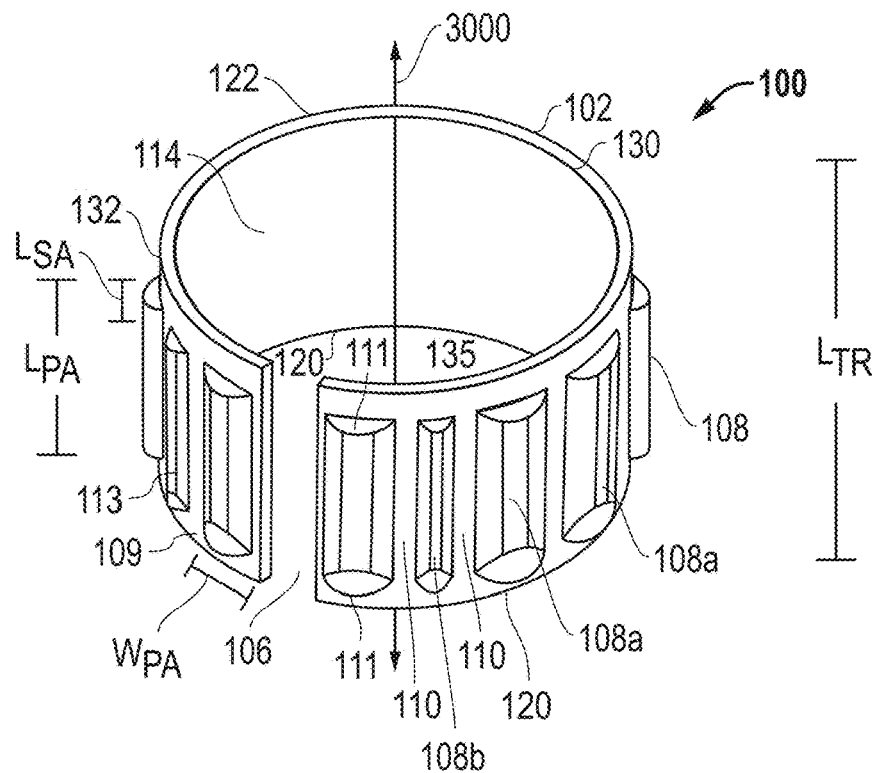
FIG. 3A includes a perspective view of one embodiment of a tolerance ring constructed in accordance with the invention.

FIG. 3A depicts a tolerance ring 100 including one embodiment formed from a blank of material or composite material 1000, 1001, 1002, 1003 as described above. The tolerance ring 100 includes a sidewall 102. The sidewall 102 may be formed from a blank as described above and may include a substrate 119 (e.g. spring steel) that may be curved into a ring-like (substantially annular or generally cylindrical) shape about a central axis 3000, forming an aperture 115. The ends of the sidewall 102 may not meet (e.g., it may be formed as a split ring), thereby leaving an axial gap 106 adjacent the circumference of the sidewall 102. In other embodiments, the sidewall may be curved so that the ends overlap with one another. In yet further embodiments, as shown best in FIG. 3B, the sidewall 102 may be a continuous, unbroken ring. The sidewall 102 may further include a low friction layer 104 that conforms to the shape of the sidewall 102, as formed as a low friction layer 104 from the blank of composite material 1000, 1001, 1002, 1003 as described above. The tolerance ring 100 and/or sidewall 102 may have a first axial end 120, and a second axial end 122. The tolerance ring 100 and/or sidewall 102 may have an inner surface 130, and an outer surface 132. The inner surface 130 of the tolerance ring 100 and/or sidewall 102 may have a low friction layer 104 that conforms to the shape of the sidewall, as formed from the composite material 1000, 1001, 1002, 1003 as described above.

The tolerance ring 100 may have a plurality of spaced projections 108 that extend radially inward or outward from the outer surface 132 of the tolerance ring 100. The projections may be capable of deformation upon compression. The projections 108 may be formed via stamping (e.g., pressed using a suitably shaped mold, rotary wave forming, etc.). Optionally, there may be a flat, circumferentially-extending rim 109 of composite material located on at least one axial end of the projections 108. Alternatively, the axial ends of the projections 108 may be disposed at the first axial end 120 or the second axial 122 of the tolerance ring 100. Optionally, each projection 108 may also be separated from its neighboring projections 108 by an unformed section 110 of the tolerance ring 100, which may be contiguously formed with rims 109 and spaced circumferentially between a first pair of adjacent projections 108. The projections 108 may include axially-elongated circumferential ridges extending in the radial direction that may be similar in shape to waves used on conventional tolerance rings. The peak 113 of each ridge may be rounded, and the axial ends of each ridge terminate at a pair of tapered shoulders 111. Optionally, the tolerance ring 100 may include an unformed region 114 on the opposite surface as surface that the projections 108 extend radially from. For example, as shown in FIG. 3A, the unformed region 114 may be on the inner surface 130 while the projections 108 extend radially outwardly along the outer surface 132. The unformed region 114 may include no projections and be contiguous with the sidewall 102.

Figure 3B:
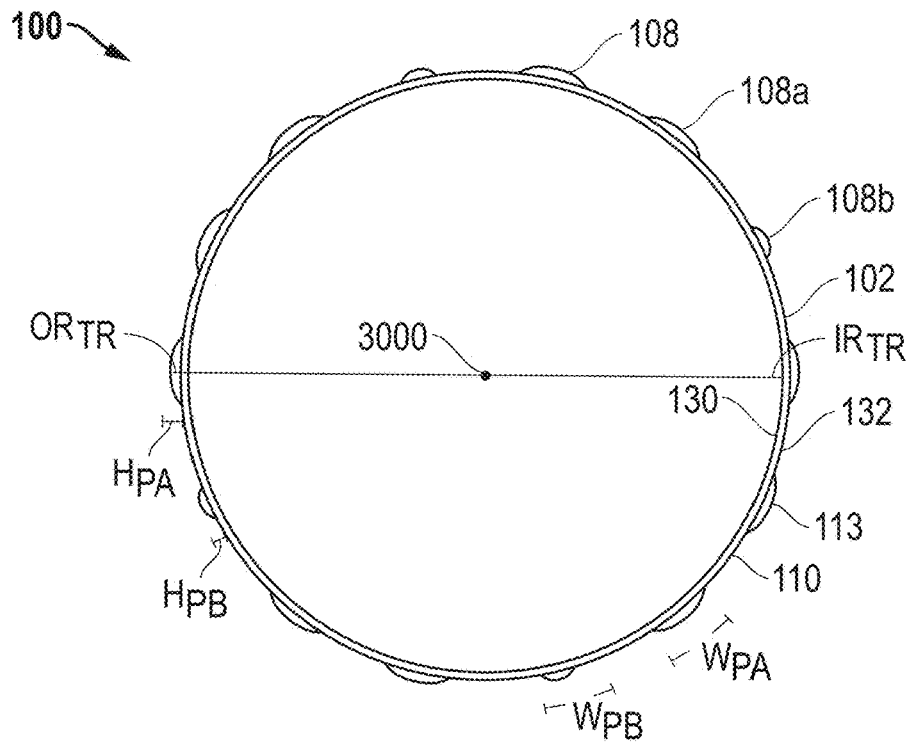
FIG. 3B includes a top view of one embodiment of a tolerance ring constructed in accordance with the invention.
Figure 3C:
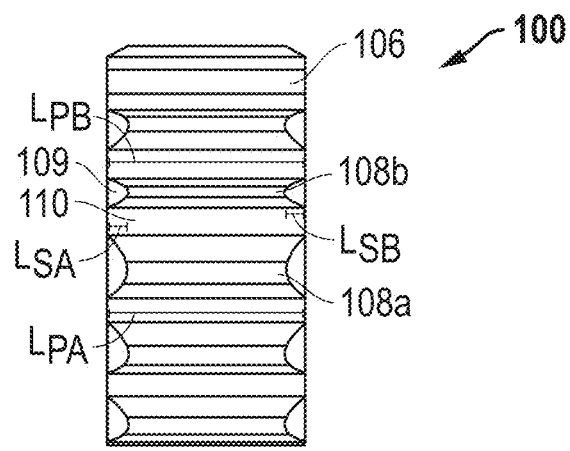
FIG. 3C includes a side view of one embodiment of a tolerance ring constructed in accordance with the invention.

As shown in FIGS. 3A-3C, the tolerance ring 100 may include a plurality of projections 108 of different types. The tolerance ring 100 may include a first type of projection 108a and a second type of projection 108b. The first type of projection 108a may have a radial height, $H_{P4}$. For purposes of embodiments described herein, the radial height, $H_{P4}$, of the first type of projection 108a is the distance from the peak 113 of the projection 108a to the unformed region 114 of the sidewall 102, as shown best in FIG. 3B. According to certain embodiment, the radial height, $H_{P4}$, of the first type of projection 108a may be at least about 0.1 mm or at least about 0.2 mm or at least about 0.3 mm or at least about 0.4 mm or even at least about 0.5 mm. According to still other embodiments, the radial height, $H_{P4}$, of the first type of projection 108a may be not greater than about 10 mm, such as not greater than about 8 mm, not greater than 6 mm, 5 mm, 3 mm, 1 mm, 0.9 mm or even not greater than about 0.8 mm. In a number of embodiments, the radial height, $H_{P4}$, of the first type of projection 108a may be in the range of at least about 0.1 mm to no greater than about 1.5 mm. It will be appreciated that the radial height, $H_{P4}$, of the first type of projection 108a may be within a range between any of the minimum and maximum values noted above. It will be further appreciated that the radial height, $H_{P4}$, of the first type of projection 108a may be any value between any of the minimum and maximum values noted above. It can also be appreciated that radial height, $H_{P4}$, of the first type of projection 108a may vary along its circumference and may vary across a plurality of tolerance rings.

The first type of projection 108a may have a circumferential width, $W_{P4}$. For purposes of embodiments described herein, the circumferential width, $W_{P4}$, of the first type of projection 108a is the distance from the edge of one unformed section 110 adjacent to the first type of projection 108a to the unformed section 110 on the circumferentially opposite side of the first type of projection 108a, as shown best in FIG. 3B. According to certain embodiment, the circumferential width, $W_{P4}$, of the first type of projection 108a may be at least about 0.1 mm or at least about 0.2 mm or at least about 0.3 mm or at least about 0.4 mm or even at least about 0.5 mm. According to still other embodiments, the circumferential width, $W_{P4}$, of the first type of projection 108a may be not greater than about 20 mm, such as, not greater than about 15 mm, 10 mm, 5 mm, 1 mm, 0.9 mm or even not greater than about 0.8 mm. In a number of embodiments, the circumferential width, $W_{P4}$, of the first type of projection 108a may be in the range of at least about 1 mm to no greater than about 10 mm. It will be appreciated that the circumferential width, $W_{P4}$, of the first type of projection 108a may be within a range between any of the minimum and maximum values noted above. It will be further appreciated that the circumferential width, $W_{P4}$, of the first type of projection 108a may be any value between any of the minimum and maximum values noted above. It can also be appreciated that circumferential width, $W_{P4}$, of the first type of projection 108a may vary along its circumference and may vary across a plurality of tolerance rings.

The first type of projection 108a may have a shoulder length, $L_{SA}$. For purposes of embodiments described herein, the shoulder length, $L_{SA}$, of the first type of projection 108a is the distance from the rim 109 or axial end 120, 122 of the tolerance ring 100 to the edge of the top of the shoulder 111 at the peak 113, as shown best in FIG. 3C. According to certain embodiment, the shoulder length, $L_{SA}$, of the first type of projection 108a may be at least about 0.1 mm or at least about 0.2 mm or at least about 0.3 mm or at least about 0.4 mm or even at least about 0.5 mm. According to still other embodiments, the shoulder length, $L_{SA}$, of the first type of projection 108a may be not greater than about 5 mm, such as not greater than 1 mm, not greater than about 0.9 mm or even not greater than about 0.8 mm. In a number of embodiments, the shoulder length, $L_{SA}$, of the first type of projection 108a may be in the range of at least about 0.3 mm to no greater than about 2 mm. It will be appreciated that the shoulder length, $L_{SA}$, of the first type of projection 108a may be within a range between any of the minimum and maximum values noted above. It will be further appreciated that the shoulder length, $L_{SA}$, of the first type of projection 108a may be any value between any of the minimum and maximum values noted above. It can also be appreciated that shoulder length, $L_{SA}$, of the first type of projection 108a may vary along its circumference and may vary across a plurality of tolerance rings.

The first type of projection 108a may have a slope of the ridge $S_{RP4}$. For purposes of embodiments described herein, the slope of the ridge, $S_{RP4}$, of the first type of projection 108a is the radial height, $H_{P4}$, of the first type of projection 108a divided by half of the circumferential width, $W_{P4}$, of the first type of projection 108a. According to certain embodiment, the slope of the ridge, $S_{RP4}$, of the first type of projection 108a may be at least about 0.1 or at least about 0.2 or at least about 0.3 or at least about 0.4, at least about 0.5, at least about 1, at least about 2, at least about 4, at least about 6, or even at least about 10. According to still other embodiments, the slope of the ridge, $S_{RP4}$, of the first type of projection 108a may be not greater than about 50, such as, not greater than about 20 or even not greater than about 10. In a number of embodiments, the slope of the ridge, $S_{RP4}$, of the first type of projection 108a may be in the range of at least about 0.02 to no greater than about 3. It will be appreciated that the slope of the ridge, $S_{RP4}$, of the first type of projection 108a may be within a range between any of the minimum and maximum values noted above. It will be further appreciated that the slope of the ridge, $S_{RP4}$, of the first type of projection 108a may be any value between any of the minimum and maximum values noted above. It can also be appreciated that slope of the ridge, $S_{RP4}$, of the first type of projection 108a may vary along the circumferential length of the first type of projection 108a and may vary across a plurality of tolerance rings.

In a particular embodiment, the first type of projections 108a of tolerance ring 100 can have a radial stiffness of about 50 to about 6000 N. Moreover, the radial stiffness of the first type of projections 108a can also be within a range between and including any of the values described above. Radial stiffness of the first type of projections 108a of the tolerance ring 100 can be measured by measuring the radial force required to compress the first type of projections 108a for a component (inner or outer component as described below) clearance in the circumferential direction.

The second type of projection 108b may have a radial height, $H_{PB}$. For purposes of embodiments described herein, the radial height, $H_{PB}$, of the second type of projection 108b is the distance from the peak 113 of the projection 108b to the unformed region 114 of the sidewall 102, as shown best in FIG. 3B. According to certain embodiment, the radial height, $H_{PB}$, of the second type of projection 108b may be at least about 0.1 mm or at least about 0.2 mm or at least about 0.3 mm or at least about 0.4 mm or even at least about 0.5 mm. According to still other embodiments, the radial height, $H_{PB}$, of the second type of projection 108b may be not greater than about 10 mm, such as not greater than 8 mm, not greater than 6 mm, 5 mm, 3 mm, 1 mm, 0.9 mm or even not greater than about 0.8 mm. In a number of embodiments, the radial height, $H_{PB}$, of the second type of projection 108b may be in the range of at least about 0.1 mm to no greater than about 1.5 mm. It will be appreciated that the radial height, $H_{PB}$, of the second type of projection 108b may be within a range between any of the minimum and maximum values noted above. It will be further appreciated that the radial height, $H_{PB}$, of the second type of projection 108b may be any value between any of the minimum and maximum values noted above. It can also be appreciated that radial height, $H_{PB}$, of the second type of projection 108b may vary along its circumference and may vary across a plurality of tolerance rings. In a number of embodiments, the first type of projections 108a may have a different radial height versus the second type of projections 108b. This may result in the first type of projections 108a having different properties or behaviors versus the second type of projections 108b.

The second type of projection 108b may have a circumferential width, $W_{PB}$. For purposes of embodiments described herein, the circumferential width, $W_{PB}$, of the second type of projection 108b is the distance from the edge of one unformed section 110 adjacent to the second type of projection 108b to the unformed section 110 on the circumferentially opposite side of the second type of projection 108b, as shown best in FIG. 3B. According to certain embodiment, the circumferential width, $W_{PB}$, of the second type of projection 108b may be at least about 0.1 mm or at least about 0.2 mm or at least about 0.3 mm or at least about 0.4 mm or even at least about 0.5 mm. According to still other embodiments, the circumferential width, $W_{PB}$, of the second type of projection 108b may be not greater than about 20 mm, such as, not greater than about 15 mm, 10 mm, 5 mm, 1 mm, 0.9 mm or even not greater than about 0.8 mm. In a number of embodiments, the circumferential width, $W_{PB}$, of the second type of projection 108b may be in the range of at least about 1 mm to no greater than about 10 mm. It will be appreciated that the circumferential width, $W_{PB}$, of the second type of projection 108b may be within a range between any of the minimum and maximum values noted above. It will be further appreciated that the circumferential width, $W_{PB}$, of the second type of projection 108b may be any value between any of the minimum and maximum values noted above. It can also be appreciated that circumferential width, $W_{PB}$, of the second type of projection 108b may vary along its circumference and may vary across a plurality of tolerance rings. In a number of embodiments, the first type of projections 108a may have a different circumferential width versus the second type of projections 108b. This may result in the first type of projections 108a having different properties or behaviors versus the second type of projections 108b.

The second type of projection 108b may have a shoulder length, $L_{SB}$. For purposes of embodiments described herein, the shoulder length, $L_{SB}$, of the second type of projection 108b is the distance from the rim 109 or axial end 120, 122 of the tolerance ring 100 to the edge of the top of the shoulder 111 at the peak 113, as shown best in FIG. 3C. According to certain embodiment, the shoulder length, $L_{SB}$, of the second type of projection 108b may be at least about 0.1 mm or at least about 0.2 mm or at least about 0.3 mm or at least about 0.4 mm or even at least about 0.5 mm. According to still other embodiments, the shoulder length, $L_{SB}$, of the second type of projection 108b may be not greater than about 5 mm, such as not greater than about 1 mm, not greater than about 0.9 mm or even not greater than about 0.8 mm. In a number of embodiments, the shoulder length, $L_{SB}$, of the second type of projection 108b may be in the range of at least about 0.3 mm to no greater than about 2 mm. It will be appreciated that the shoulder length, $L_{SB}$, of the second type of projection 108b may be within a range between any of the minimum and maximum values noted above. It will be further appreciated that the shoulder length, $L_{SB}$, of the second type of projection 108b may be any value between any of the minimum and maximum values noted above. It can also be appreciated that shoulder length, $L_{SB}$, of the second type of projection 108b may vary along its circumference and may vary across a plurality of tolerance rings. In a number of embodiments, the first type of projections 108a may have a different shoulder length versus the second type of projections 108b. This may result in the first type of projections 108a having different properties or behaviors versus the second type of projections 108b.

The second type of projection 108b may have a slope of the ridge $S_{RPB}$. For purposes of embodiments described herein, the slope of the ridge, $S_{RPB}$, of the second type of projection 108b is the radial height, $H_{PB}$, of the second type of projection 108b divided by half of the circumferential width, $W_{PB}$, of the second type of projection 108b. According to certain embodiment, the slope of the ridge, $S_{RPB}$, of the second type of projection 108b may be at least about 0.1 or at least about 0.2 or at least about 0.3 or at least about 0.4, at least about 0.5, at least about 1, at least about 2, at least about 4, at least about 6, or even at least about 10. According to still other embodiments, the slope of the ridge, $S_{RPB}$, of the second type of projection 108b may be not greater than about 50, such as, not greater than about 20 or even not greater than about 10. A number of embodiments, the slope of the ridge, $S_{RPB}$, of the second type of projection 108b may be in the range of at least about 0.02 to no greater than about 3. It will be appreciated that the slope of the ridge, $S_{RPB}$, of the second type of projection 108b may be within a range between any of the minimum and maximum values noted above. It will be further appreciated that the slope of the ridge, $S_{RPB}$, of the second type of projection 108b may be any value between any of the minimum and maximum values noted above. It can also be appreciated that slope of the ridge, $S_{RPB}$, of the second type of projection 108b may vary along the circumferential length of the second type of projection 108b and may vary across a plurality of tolerance rings. In a number of embodiments, the first type of projections 108a may have a different slope of at least one ridge of the projection versus the second type of projections 108b. This may result in the first type of projections 108a having different properties or behaviors versus the second type of projections 108b.

In a particular embodiment, the second type of projection 108b of tolerance ring 100 can have a radial stiffness of about 50 to about 6000 N. Moreover, the radial stiffness of the second type of projection 108b can also be within a range between and including any of the values described above. Radial stiffness of the second type of projection 108b of the tolerance ring 100 can be measured by measuring the radial force required to compress the second type of projection 108b for a component (inner or outer component as described below) clearance in the circumferential direction. In a number of embodiments, the torque of the second type of projection 108b may be about 2500 N/mm.

Figure 4:
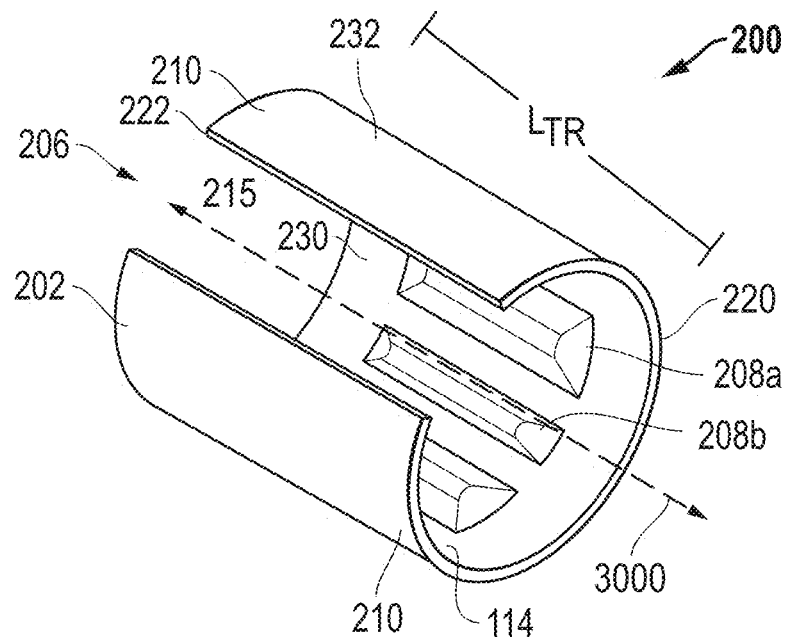
FIG. 4 includes a perspective view of another embodiment of a tolerance ring constructed in accordance with the invention.

FIG. 4 depicts another embodiment of a tolerance ring 200. In a similar way to FIG. 3, the tolerance ring 200 and/or sidewall 202 may have a first axial end 220, and a second axial end 222, and be formed about a central axis 3000, forming an aperture 215. The tolerance ring 200 and/or sidewall 202 may have an inner surface 230, and an outer surface 232. The sidewall 202 also may have a plurality of projections 208 (208a, 208b) that extend radially inward from its inner surface 130. The projections 208 (208a, 208b) may circumferentially abut one other as shown, or be circumferentially spaced-apart as in the embodiment of FIG. 3A. The projections 208 (208a, 208b) may be of similar shape, parameter (e.g., radial height of the projections, stiffness of the projections), or orientation as the projections 108 (108a, 108b) described above in FIGS. 3A-3C.

In operation, the tolerance ring 100 may be located between two components in an assembly. For example, it may be located in the annular space between an inner component (for example, a shaft) and a bore in an outer component (for example, a housing). The projections 108 may be compressed between the inner and outer components. Each projection 108 may act as a spring and deforms to fit the components together with zero clearance therebetween. In other words, the inner component contacts the inner surfaces 130 of the tolerance ring 100 and the outer component contacts the outer surfaces 132 of the tolerance ring 100.

Figure 5A:
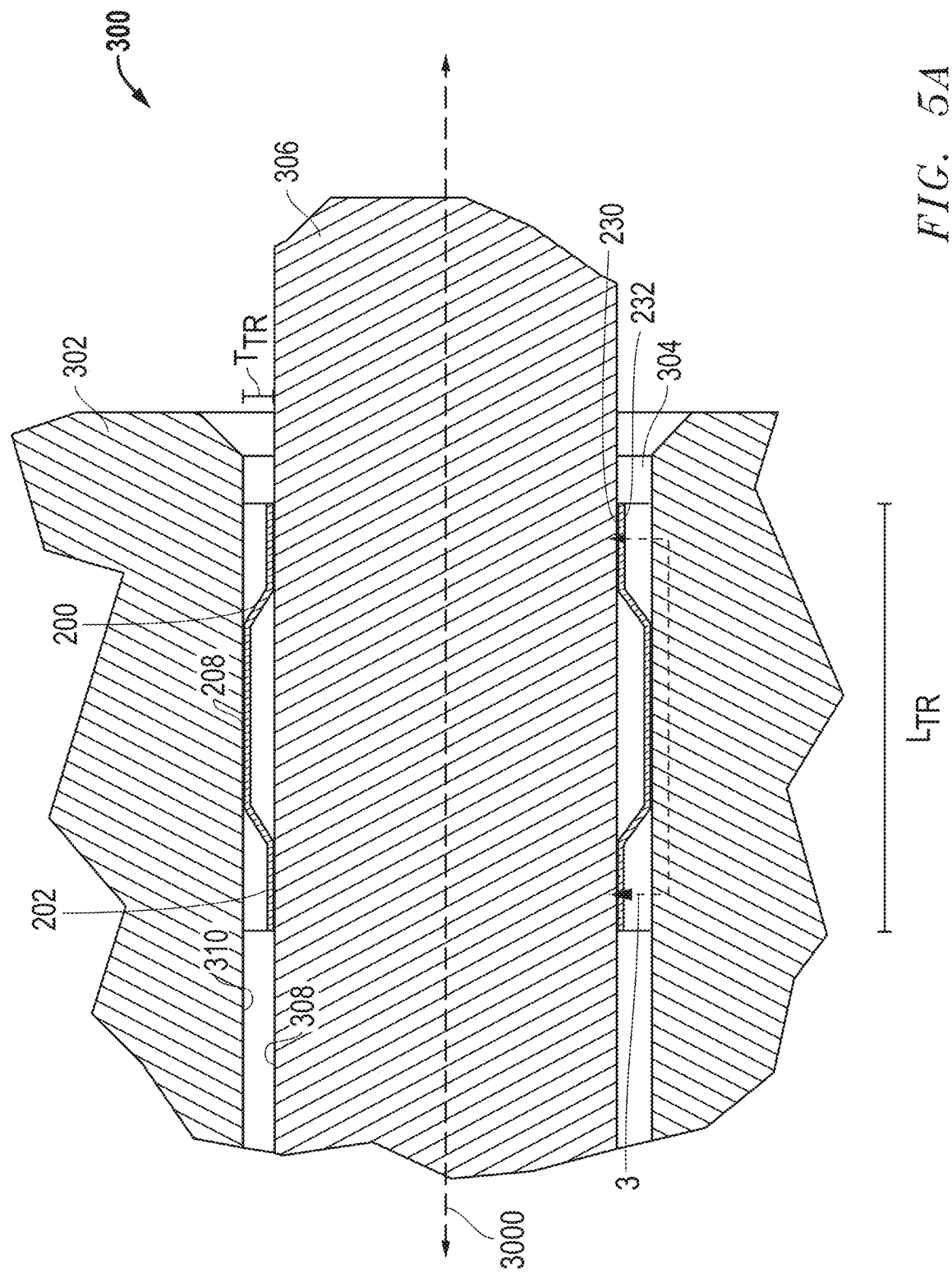
FIG. 5A includes an axial sectional view of the tolerance ring of FIG. 3A in an assembly.

FIG. 5A depicts an axial sectional view through an exemplary assembly 300 including an embodiment of a tolerance ring 200. The assembly 300 incorporates, for example, the tolerance ring 200 shown in FIG. 3A. The assembly 300 may include a housing 302 or outer component down a central axis 3000. The housing 302 may have an axial bore 304 formed therein, which receives a shaft 306 or inner component. An annular gap exists between the outer surface 308 of shaft 306 and the inner surface 310 of bore 304. The size of this annular gap may be variable because the diameter of the shaft 306 and bore 304 may vary within manufacturing tolerances. To prevent vibration of the shaft 306 within the bore 304, the annular gap is filled by tolerance ring 200 to form a zero-clearance fit between the components. In use, the circumferential projections 208 of the tolerance ring 200 may be radially compressed in the annular gap between the shaft 306 and housing 302, such that the projections 208 contact the inner component 306. Tolerance rings may be used to transfer torque or as torque limiters in such applications.

Figure 5B:
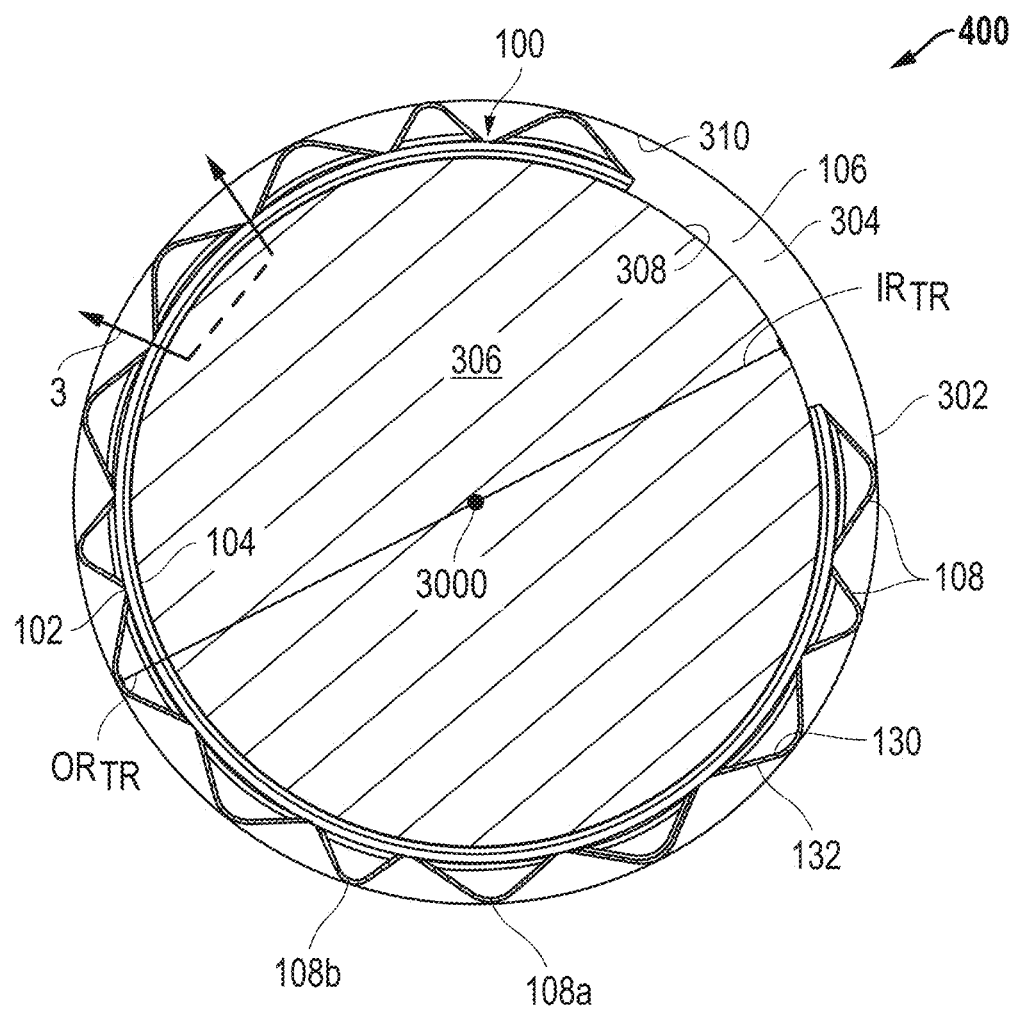
FIG. 5B includes an radial sectional view of the tolerance ring of FIG. 3A in the assembly.

FIG. 5B depicts an axial sectional view through an exemplary assembly 400 including another embodiment of a tolerance ring 100. The assembly 300 incorporates, for example, the tolerance ring 100 shown in FIG. 3A. The assembly 400 may include a housing 302 or outer component down a central axis 3000. The housing 302 may have an axial bore 304 formed therein, which receives a shaft 306 or inner component. An annular gap exists between the outer surface 308 of shaft 306 and the inner surface 310 of bore 304. The size of this annular gap may be variable because the diameter of the shaft 306 and bore 304 may vary within manufacturing tolerances. To prevent vibration of the shaft 306 within the bore 304, the annular gap is filled by tolerance ring 100 to form a zero-clearance fit between the components. In use, the circumferential projections 108 of the tolerance ring 100 may be radially compressed in the annular gap between the shaft 306 and inside of the bore 304 of the housing 302, such that the projections 108 contact the outer component 302.

In a number of embodiments, as shown in FIGS. 3A and 4-5B, the tolerance ring 100, 200 may have a length $L_{TR}$ as measured between the first axial end 120, 220, and the second axial end 122, 22 of the tolerance ring 100, 200. It will be appreciated that the length $L_{TR}$ may be substantially similar to the length of the material or composite material 1000, 1001, 1002, 1003 as shown in FIGS. 2A-2D. According to certain embodiment, the length $L_{TR}$ of the tolerance ring 100, 200 may be at least about 1 mm, such as, at least about 10 mm or at least about 30 mm or at least about 50 mm or at least about 100 mm or even at least about 500 mm. According to still other embodiments, the length $L_{TR}$ of the tolerance ring 100, 200 may be not greater than about 1000 mm, such as, not greater than about 500 mm or even not greater than about 250 mm. It will be appreciated that the length $L_{TR}$ of the tolerance ring 100, 200 may be within a range between any of the minimum and maximum values noted above. It will be further appreciated that the length $L_{TR}$ of the tolerance ring 100, 200 may be any value between any of the minimum and maximum values noted above. It can also be appreciated that length $L_{TR}$ of the tolerance ring 100, 200 may vary along its circumference.

In a number of embodiments, as shown best in FIGS. 3B and 5B, the tolerance ring 100, 200 may have a particular inner radius $IR_{TR}$. For purposes of embodiments described herein, the inner radius $IR_{TR}$ of the tolerance ring 100, 200 is the distance from the central axis 3000 to the inner surface 130, 230. According to certain embodiment, the inner radius $IR_{TR}$ of the tolerance ring 100, 200 may be at least about 10 mm or at least about 20 mm or at least about 30 mm or at least about 50 mm or even at least about 100 mm. According to still other embodiments, the inner radius $IR_{TR}$ of the tolerance ring 100, 200 may be not greater than about 500 mm, such as, not greater than about 250 mm or even not greater than about 100 mm. It will be appreciated that the inner radius $IR_{TR}$ of the tolerance ring 100, 200 may be within a range between any of the minimum and maximum values noted above. It will be further appreciated that the inner radius $IR_{TR}$ of the tolerance ring 100, 200 may be any value between any of the minimum and maximum values noted above. It can also be appreciated that the inner radius $IR_{TR}$ of the tolerance ring 100, 200 may vary along its circumference and may vary across a plurality of tolerance rings.

In a number of embodiments, as shown best in FIGS. 3B and 5B, the tolerance ring 100, 200 may have a particular outer radius $OR_{TR}$. For purposes of embodiments described herein, the outer radius $OR_{TR}$ of the tolerance ring 100, 200 is the distance from the central axis 3000 to the outer surface 132, 232. According to certain embodiment, the outer radius $OR_{TR}$ of the tolerance ring 100, 200 may be at least about 10 mm or at least about 20 mm or at least about 30 mm or at least about 50 mm or even at least about 100 mm. According to still other embodiments, the outer radius $OR_{TR}$ of the tolerance ring 100, 200 may be not greater than about 500 mm, such as, not greater than about 250 mm or even not greater than about 100 mm. It will be appreciated that the outer radius $OR_{TR}$ of the tolerance ring 100, 200 may be within a range between any of the minimum and maximum values noted above. It will be further appreciated that the outer radius $OR_{TR}$ of the tolerance ring 100, 200 may be any value between any of the minimum and maximum values noted above. It can also be appreciated that the outer radius $OR_{TR}$ of the tolerance ring 100, 200 may vary along its circumference and may vary across a plurality of tolerance rings.

In a number of embodiments, as shown best in FIGS. 2A-2D and 5A, the tolerance ring 100, 200 may have a particular thickness $T_{TR}$. For purposes of embodiments described herein, the thickness $T_{TR}$ of the tolerance ring 100, 200 is the distance from the inner surface 130, 230 to the outer surface 132, 232. It will be appreciated that thickness $T_{TR}$ of the tolerance ring 100, 200 may be substantially similar or the same thickness as the material or composite material 1000, 1001, 1002, 1003 as shown in FIGS. 2A-2D. According to certain embodiment, the thickness $T_{TR}$ of the tolerance ring 100, 200 may be at least about 0.1 mm or at least about 0.2 mm or at least about 0.3 mm or at least about 0.4 mm or even at least about 0.5 mm. According to still other embodiments, the $T_{TR}$ of the tolerance ring 100, 200 may be not greater than about 1 mm, such as, not greater than about 0.9 mm or even not greater than about 0.8 mm. It will be appreciated that the thickness $T_{TR}$ of the tolerance ring 100, 200 may be within a range between any of the minimum and maximum values noted above. It will be further appreciated that the thickness $T_{TR}$ of the tolerance ring 100, 200 may be any value between any of the minimum and maximum values noted above. It can also be appreciated that the thickness $T_{TR}$ of the tolerance ring 100, 200 may vary along its circumference. It can also be appreciated that thickness $T_{TR}$ of the tolerance ring 100, 200 may vary along its circumference and may vary across a plurality of tolerance rings.

Figure 6:
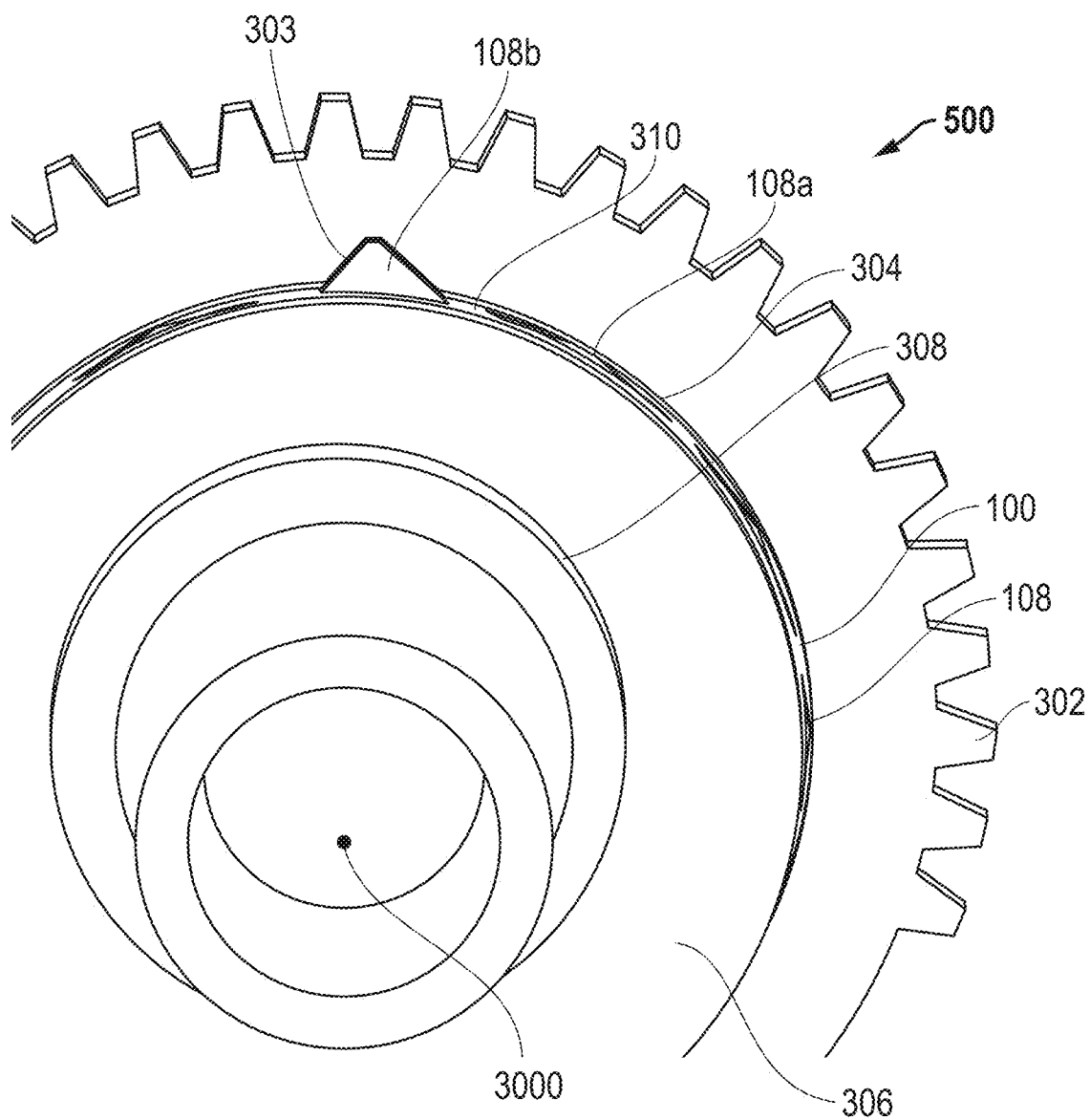
FIG. 6 includes an end view of a tolerance ring in an assembly in accordance with an embodiment.

FIG. 6 depicts an end view through an exemplary assembly 500 including another embodiment of a tolerance ring 100. The assembly 500 incorporates, for example, the tolerance ring 100 shown in FIG. 3A. The assembly 500 may include a housing 302 or outer component. The housing 302 may have an axial bore 304 formed therein, which receives a shaft 306 or inner component. An annular gap exists between the outer surface 308 of shaft 306 and the inner surface 310 of bore 304. The size of this annular gap may be variable because the diameter of the shaft 306 and bore 304 may vary within manufacturing tolerances. To prevent vibration of the shaft 306 within the bore 304, the annular gap is filled by tolerance ring 100 to form a zero-clearance fit between the components. In use, the circumferential projections 108 of the tolerance ring 100 may be radially compressed in the annular gap between the shaft 306 and inside of the bore 304 of the housing 302, such that the projections 108 contact the outer component 302. In this embodiment, at least one of the inner component 306 or the outer component 302 may include a groove 303 adapted to house at least one of the projections 108 to prevent circumferential movement between the tolerance ring projection 108 and the groove 303. In another embodiment, the at least one of the inner component 306 or the outer component 302 may include a groove adapted to house the tolerance ring 100 itself to prevent axial movement between the tolerance ring 100 and the inner component 306 or the outer component 302. For example, as shown in FIG. 6, the groove 303 may be located on the outer component 302 and house a radially extending projection of the second type projecting outwardly 108b. As a result, the tolerance ring 100 may be constrained from moving in the axial or circumferential direction along or about the central axis 3000 due to a lock between the projection 108b and the groove 303 in the outer component 302.

In at least one embodiment, the assembly 300, 400, 500 may include a lubricant. In at least one embodiment, the lubricant may include a grease including at least one of lithium soap, lithium disulfide, graphite, mineral or vegetable oil, silicone grease, fluoroether-based grease, apiezon, food-grade grease, petrochemical grease, or may be a different type. In at least one embodiment, the lubricant may include an oil including at least one of a Group I-Group III+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based oil, or may be a different type. In at least one embodiment, the lubricant may include a solid based lubricant including at least one of lithium soap, graphite, boron nitride, molybdenum disulfide, tungsten disulfide, polytetrafluoroethylene, a metal, a metal alloy, or may be a different type. In the case of using a lubricant, it is desirably disposed at least along the desired slip interface (described below).

In normal operation a rotational torque is applied to one of the inner and outer components, and that torque is transferred by the interference fit of the tolerance ring to the other of the inner and outer components. However, should one of the components be rotationally bound up, the tolerance ring functions to allow slippage between the inner and outer components. According to embodiments herein, that slippage happens at a desired slip interface, generally the surface opposite the projections. For example, in some embodiments shown having outwardly projecting projections, the slip interface occurs along the radially inside surface of the tolerance ring, at the tolerance ring/inner component interface. This may be due to using a first type of radially extending projection and a second type of radially extending projection with different properties from each other based on differences in radial height, circumferential width, shoulder length, slope, or stiffness, as described above. In order to ensure slippage at the desired interface, opposite the waves/projections, the breakaway torque, τ, at the two interfaces (radially opposite surfaces of the tolerance ring) are different. The breakaway torque, τ, is defined below. Here, the breakaway torque, τ, at the desired slip interface is lower than the breakaway torque, τ, at the non-slip interface.

By non-limiting example, the second type of projections 108b may include sharper profiles that may engage more aggressively into the inner or outer component that the projections contact. The second type of projections 108b may have differences in their parameters (e.g. radial height, circumferential width, shoulder length, slope, or stiffness) from the first type of projections 108a that may cause the sharper profile and provide different behaviors and properties of each type of projections. As a result, according to certain embodiments, the first type of projection provides a desired tolerance compensation to accommodate manufacturing tolerance between the inner and outer components. In addition, the second type provides enhanced 'bite' or 'grip' between the tolerance ring and the contacting inner/outer member, which in turn enhances the breakaway torque at that interface. The number, placement, and parameters (e.g., radial height, circumferential width, shoulder length, slope, or stiffness) of the second type of projections 108b versus the first type of projections 108a are chosen to give the projections different properties and/or behaviors to achieve desired slip performance with a robust torque performance whilst constraining the slip to the desired surface of the inner or outer component.

According to embodiments, the tolerance ring may have a first break-away torque, $\tau_1$, defined as the breakaway torque between the tolerance ring projections and the inner or outer component that the projections contact, and a second break-away torque, $\tau_2$, defined as the breakaway torque between the unformed region and the other of the inner and outer components. In a number of embodiments, $1.1\ \tau_2 \leq \tau_1$, such as $1.2\ \tau_2 \leq \tau_1$, such as $1.5\ \tau_2 \leq \tau_1$, such as $2\ \tau_2 \leq \tau_1$, or even $5\ \tau_2 \leq \tau_1$. As previously mentioned, the first type of projections may be adapted to provide tolerance compensation between the inner and outer components, and a second type of projections may be adapted to engage the inner component 306 or the outer component 302 to increase circumferential break-away torque, $\tau 2$ at that interface.

Figure 7:
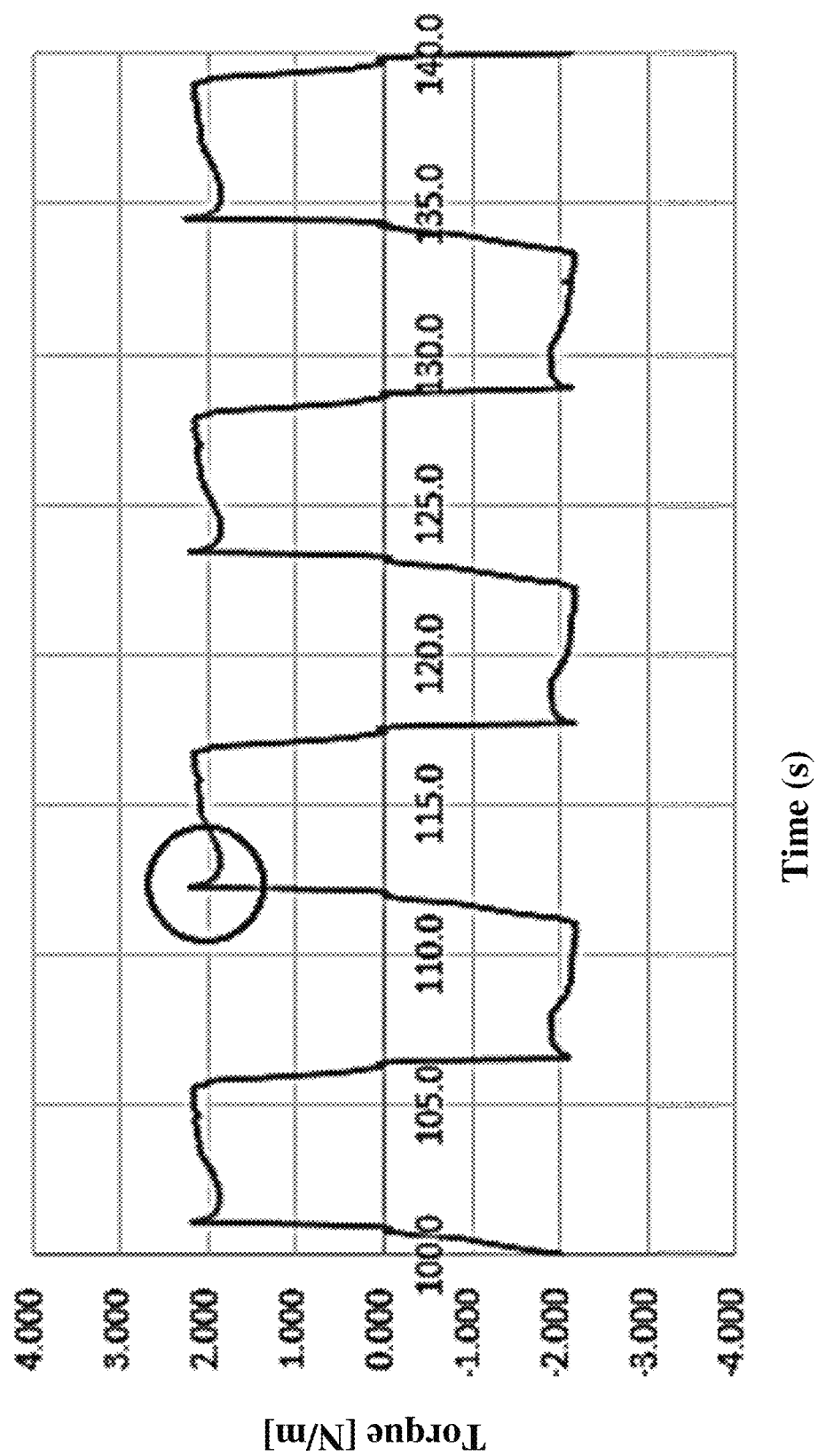
FIG. 7 includes a sample graph of the torque (N·m) as a function of function of the time (s) when testing a tolerance ring in accordance with an embodiment.

Measurement of torque values as described herein is done with a torque test apparatus model Helixa-i provided by Mecmesin Ltd. The tolerance ring is disposed between inner and outer components, and securely fastened to the inner component to measure breakaway torque at the radially outer interface, then in a separate test, is securely fastened to the outer component in order to measure breakaway torque at the radially inner interface. Fastening may be done using a glue such as Super Glue that is designed to affix metal components to each other. The apparatus is run at room temperature (about 21° C.)+360°, −360° at 30 rpm for 50 cycles to apply increased torque between the inner and outer components and the measured peak torque is recorded, which generally correlates to the torque value as slippage initiates. The test is run on tolerance rings having no low friction coating but with grease provided along the slip interface being evaluated. Consequently, in an embodiment having a low friction layer, the test is done with the low friction layer removed in order to ensure the measured breakaway torque values are not dependent on such a low friction layer. A sample resulting graph of the torque (N·m) as a function of the time (s) is shown as FIG. 7. As shown, the circled area 702 is where the break torque occurs.

Examples

Figure 8:
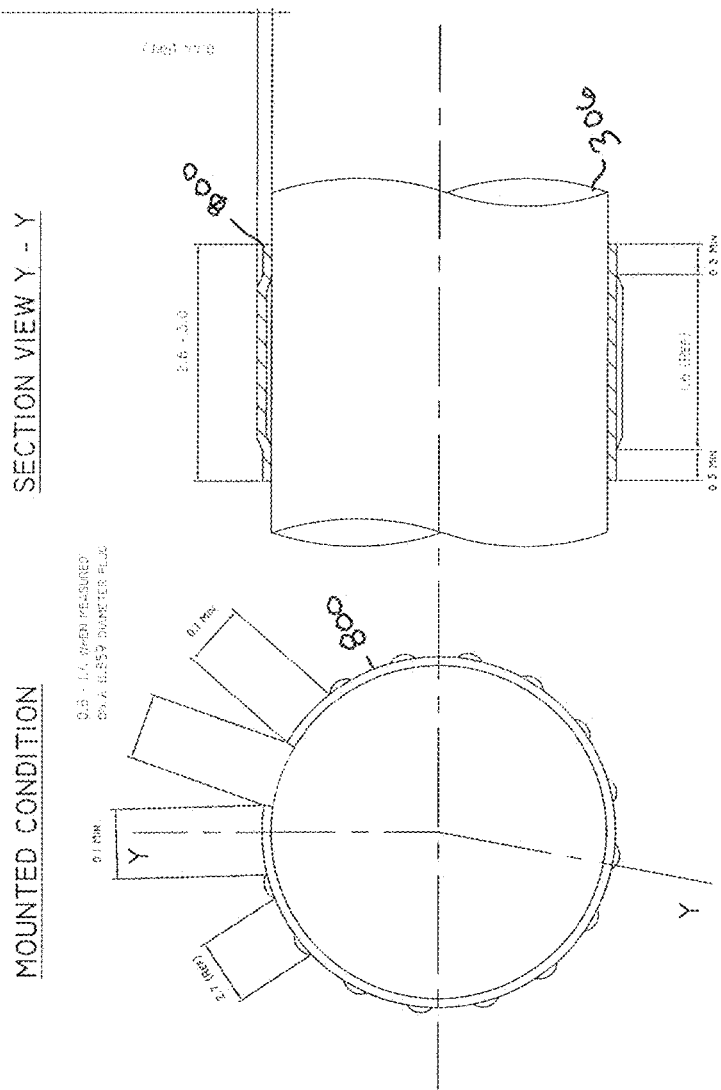
FIG. 8 includes multiple of a control tolerance ring in a free state condition or in an assembly.
Figure 9:
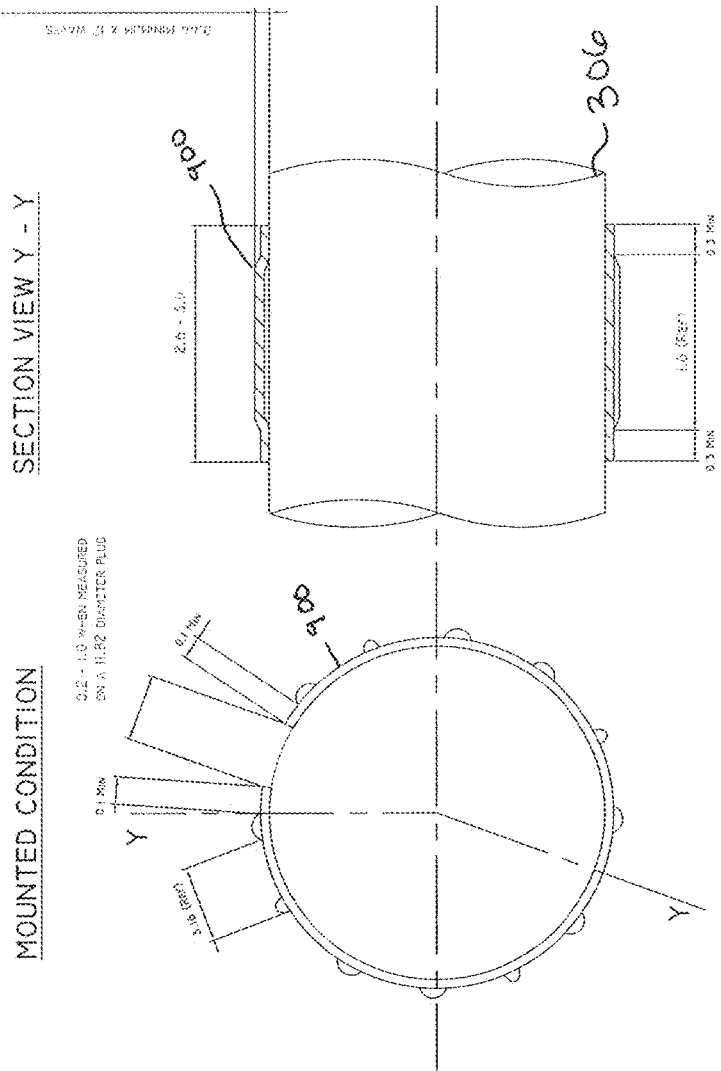
FIG. 9 includes multiple of an experimental tolerance ring in a free state condition or in an assembly in accordance with an embodiment.

Two tolerance rings were tested. The first tolerance ring (Ring A) is a control ring which had only projections of the first type of projection facing radially outwards. A drawing of Ring A 800 in several views in a free state condition or a mounted condition (around an inner component 306) is shown in FIG. 8. Ring A has 14 of the first type of projections equally spaced around the circumference with allowable burr specification of 0.2 max. When assembled between an 11.859 mm diameter inner component and a 12.692 mm outer component, an assembly force of 18 to 32 kg was felt. The end wave height was about 0.42 mm minimum. Ring A has a 12.5 mm diameter, a 3 mm length, and a 0.2+/−0.013 mm thickness. Ring A has a material hardness of about 400 to about 450 VPN. Ring A is made of stainless steel. The second tolerance ring (Ring B) is an experimental ring according to embodiments herein which had projections of the first type of projection and projections of the second type of projection both facing radially outwards. A drawing of Ring B 900 in several views in a free state condition or a mounted condition (around an inner component 306) is shown in FIG. 9. Ring B has 10 of the first type of projections and 4 of the second type of projections equally spaced around the circumference as shown with allowable burr specification of 0.2 max. When assembled between an 11.82 mm diameter inner component and a 12.692 mm outer component, an assembly force of 18 to 32 kg was felt. The end wave height was about 0.42 mm minimum. Ring B has a 12.5 mm diameter, a 3 mm length, and a 0.2+/−0.013 mm thickness. Ring B has a material hardness of about 400 to about 450 VPN. Ring B is made of stainless steel. The tolerance rings were designed such that slip was desired to occur against the shaft instead of the housing. Rings A and B were both tested for slip torque in two conditions: 1) glued to a shaft or inner component to ensure a slip on a slip surface on the housing or outer component; or 2) glued to a housing or outer component to ensure a slip on a slip surface on the shaft or inner component. The inner component and outer component for these tests were both brass C3604 and a lubricant was applied between the tolerance rings and only the slip surface of either the inner component or the outer component. The results of these tests are shown in Table 1 below:

TABLE 1

|  | Condition 1: Break Torque against Housing Slip Surface (N · m) | Condition 2: Break Torque against Shaft Slip Surface (N · m) |
| --- | --- | --- |
| Ring A | 2 | 3 |
| Ring B | 4 | 3 |

As shown, the tendency of the system is to slip against the housing, as the torque required to do so was lower than it was on the shaft. Further as shown, Ring B with two types of projections had approximately double the torque at which slip occurs in the housing while having minor effect on the torque for slip on the shaft. Therefore, it may be concluded that the torque to slip on the shaft is lower than the torque to slip in the housing, so the slip will be on the shaft due to inclusion of the second type of projection.

Applications for such embodiments include, for example, assemblies related to rotational devices such as an electric motor (such as a windshield wiper motor), or axial sliding applications (such as a steering column adjustment mechanism). Embodiments disclosed herein have applications found in robotics, mechatronics, automotive components, or other uses. Use of the tolerance ring or assemblies may provide increased benefits in several applications. According to embodiments herein, the tolerance ring may provide desired slip only at a desired interface. This feature can protect the components of the assembly 300, 400, 500 from overload by slipping at a predetermined level of torque over multiple operation cycles at a desired surface (in the axial or circumferential direction) without significant change to the torque value at which the slip occurs. Additionally, by configuring the tolerance ring to slip at only one of the two possibly slip interfaces, the tolerance ring can be maintained in position within the assembly, such as by preventing it from migrating axially along the housing or shaft in the case of a rotational assembly. As a result, tolerance rings 100, 200 according to embodiments herein may improve torque or slip performance while maintaining appropriate tolerance compensation and position, resulting in increased lifetime and improved effectiveness and performance of the assembly, the tolerance ring, and other neighboring components.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A tolerance ring comprising: a sidewall comprising a plurality of radially extending projections on a first radial surface and an unformed region on a second radial surface opposite the first radial surface, wherein the tolerance ring provides a first break-away torque, $\tau 1$, defined as the break-away torque between the tolerance ring projections and an inner component or an outer component, wherein the tolerance ring provides a second break-away torque, $\tau 2$, defined as the breakaway torque between the unformed region and the other of the inner component or the outer component, and wherein $1.1\ \tau 2 \leq \tau 1$.

Embodiment 2

An assembly comprising: an inner component; an outer component; and a tolerance ring located between the inner and outer components to provide an interference fit therebetween, the tolerance ring comprising a sidewall comprising a plurality of radially extending projections on a first radial surface and an unformed region on a second radial surface opposite the first radial surface, wherein the tolerance ring provides a first break-away torque, $\tau 1$, defined as the breakaway torque between the tolerance ring projections and an inner component or an outer component, wherein the tolerance ring provides a second break-away torque, $\tau 2$, defined as the breakaway torque between the unformed region and the other of the inner component or the outer component, and wherein $1.1\ \tau 2 \leq \tau 1$.

Embodiment 3

The tolerance ring or assembly of any of the preceding embodiments, wherein $1.2\ \tau 2 \leq \tau 1$, $1.5\ \tau 2 \leq \tau 1$, $2\ \tau 2 \leq \tau 1$, or $5\ \tau 2 \leq \tau 1$.

Embodiment 4

The tolerance ring or assembly of any of the preceding embodiments, wherein the tolerance ring projections comprise first type of projections adapted to provide tolerance compensation between the inner component and the outer component, and a second type of projections adapted to engage the inner component or the outer component to increase circumferential break-away torque, $\tau$, between the tolerance ring and the inner component or the outer component.

Embodiment 5

The tolerance ring or assembly of any of the preceding embodiments, wherein each of the projections includes a circumferential width and a radial height, and a circumferential ridge extending in the radial direction, the ridge rising to and falling from a peak within the circumferential width and being axially bound by a pair of shoulders.

Embodiment 6

The tolerance ring or assembly of embodiment 5, wherein the first type of projections comprises a different radial height versus the second type of projections.

Embodiment 7

The tolerance ring or assembly of embodiment 5, wherein the first type of projections comprises a different circumferential width versus the second type of projections.

Embodiment 8

The tolerance ring or assembly of embodiment 5, wherein the first type of projections comprises a different shoulder length versus the second type of projections.

Embodiment 9

The tolerance ring of embodiment 5, wherein the first type of projections comprises a different slope of the circumferential ridge versus the second type of projections.

Embodiment 10

The tolerance ring of embodiment 4, wherein the first type of projections comprises a different stiffness versus the second type of projections.

Embodiment 11

The tolerance ring or assembly of any of the preceding embodiments, wherein the plurality of projections extend radially inward and contact the inner component.

Embodiment 12

The tolerance ring or assembly of any of the preceding embodiments, wherein the plurality of projections extend radially outward and contact the outer component.

Embodiment 13

The tolerance ring or assembly of any of the preceding embodiments, wherein at least one of the inner component or the outer component comprises a groove adapted to house at least one of the projections to prevent circumferential movement between the tolerance ring projection and the groove.

Embodiment 14

The tolerance ring or assembly of any of the preceding embodiments, wherein the tolerance ring has an axial gap.

Embodiment 15

The tolerance ring or assembly of any of the preceding embodiments, wherein the sidewall comprises a metal.

Embodiment 16

The tolerance ring or assembly of embodiment 15, wherein the metal comprises a carbon steel or stainless steel.

Embodiment 17

The tolerance ring or assembly of embodiment 15, wherein the first radial surface and the second radial surface comprise a metal exterior surface.

Embodiment 18

The tolerance ring or assembly any of the preceding embodiments, wherein the tolerance ring has an inner radius within the range of AA-BB mm.

Embodiment 19

The tolerance ring or assembly of any of the preceding embodiments, wherein the tolerance ring has an outer radius within the range of CC mm-DD mm.

Embodiment 20

The tolerance ring or assembly of any of the preceding embodiments, wherein the tolerance ring has a length within the range of FF to GG mm.

Embodiment 21

The tolerance ring or assembly of any of the preceding embodiments, wherein the tolerance ring comprises a lubricant.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of assembly and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A tolerance ring comprising:
a sidewall comprising
a plurality of radially extending projections on a first radial surface, and
an unformed region on a second radial surface opposite the first radial surface, wherein the projections are arranged in one line along a peripheral direction of the sidewall, wherein the plurality of radially extending projections consist of exactly two different types of projections: a first type of projections and a second type of projections, wherein each of the projections includes a circumferential width and a radial height, and a circumferential ridge extending in the radial direction, the ridge rising to and falling from a peak within the circumferential width and being axially bound by a pair of shoulders, characterized in that at least one of the following holds true: 1) the first type of projections comprises a different radial height versus the second type of projections; 2) the first type of projections comprises a different circumferential width versus the second type of projections; 3) the first type of projections comprises a different shoulder length versus the second type of projections; 4) the first type of projections comprises a different slope of the circumferential ridge versus the second type of projections; or 5) the first type of projections comprises a different stiffness versus the second type of projections.

2. The tolerance ring of claim 1, wherein the first type of projections comprises a different radial height versus the second type of projections.

3. The tolerance ring of claim 1, wherein the first type of projections comprises a different circumferential width versus the second type of projections.

4. The tolerance ring of claim 1, wherein the first type of projections comprises a different shoulder length versus the second type of projections.

5. The tolerance ring of claim 1, wherein the first type of projections comprises a different slope of the circumferential ridge versus the second type of projections.

6. The tolerance ring of claim 1, wherein the first type of projections comprises a different stiffness versus the second type of projections.

7. The tolerance ring of claim 1, wherein the tolerance ring has an axial gap.

8. The tolerance ring of claim 1, wherein the sidewall comprises a metal.

9. The tolerance ring of claim 8, wherein the metal comprises a carbon steel or stainless steel.

10. The tolerance ring of claim 8, wherein the first radial surface and the second radial surface comprise a metal exterior surface.

11. The tolerance ring of claim 1, wherein the tolerance ring has an inner radius within the range of 1 to 500 mm.

12. The tolerance ring of claim 1, wherein the tolerance ring has an outer radius within the range of 1 to 500 mm.

13. The tolerance ring of claim 1, wherein the tolerance ring has a length within the range of 1 to 1000 mm.

14. An assembly comprising:
an inner component;
an outer component; and
a tolerance ring located between the inner and outer components to provide an interference fit there between, the tolerance ring comprising a sidewall comprising
a plurality of radially extending projections on a first radial surface, and
an unformed region on a second radial surface opposite the first radial surface, wherein the projections are arranged in one line along a peripheral direction of the sidewall, wherein the tolerance ring provides a first break-away torque, $\tau_1$, defined as the breakaway torque between the tolerance ring projections and an inner component or an outer component, wherein the tolerance ring provides a second break-away torque, $\tau_2$, defined as the breakaway torque between the unformed region and the other of the inner component or the outer component, and wherein $1.1\,\tau_2 \leq \tau 1$, wherein the plurality of radially extending projections consist of exactly two different types of projections: a first type of projections and a second type of projections, wherein each of the projections includes a circumferential width and a radial height, and a circumferential ridge extending in the radial direction, the ridge rising to and falling from a peak within the circumferential width and being axially bound by a pair of shoulders, characterized in that at least one of the following holds true: 1) the first type of projections comprises a different radial height versus the second type of projections; 2) the first type of projections comprises a different circumferential width versus the second type of projections; 3) the first type of projections comprises a different shoulder length versus the second type of projections; 4) the first type of projections comprises a different slope of the circumferential ridge versus the second type of projections; or 5) the first type of projections comprises a different stiffness versus the second type of projections.

15. The tolerance ring of claim 14, wherein $1.2\,\tau_2 \leq \tau_1$.

16. The tolerance ring of claim 14, wherein the first type of projections is adapted to provide tolerance compensation between the inner component and the outer component, and the second type of projections is adapted to engage the inner component or the outer component to increase circumferential break-away torque, $\tau$, between the tolerance ring and the inner component or the outer component.

17. The tolerance ring of claim 14, wherein the plurality of projections extend radially inward and contact the inner component.

18. The tolerance ring of claim 14, wherein the plurality of projections extend radially outward and contact the outer component.

19. The tolerance ring of claim 14, wherein at least one of the inner component or the outer component comprises a groove adapted to house at least one of the projections to prevent circumferential movement between the tolerance ring projection and the groove.

* * * * *